United States Patent
Casey et al.

(10) Patent No.: US 7,515,039 B2
(45) Date of Patent: Apr. 7, 2009

(54) METHOD AND APPARATUS FOR TIRE PRESSURE MONITORING

(75) Inventors: Gary Casey, Moorpark, CA (US); Calin Miclaus, Moorpark, CA (US)

(73) Assignee: Kavlico Corporation, Moorpark, CA (US)

( * ) Notice: Subject to any disclaimer, the term of this patent is extended or adjusted under 35 U.S.C. 154(b) by 225 days.

(21) Appl. No.: 11/447,601

(22) Filed: Jun. 5, 2006

(65) Prior Publication Data

US 2007/0279201 A1    Dec. 6, 2007

(51) Int. Cl.
*B60C 23/00* (2006.01)

(52) U.S. Cl. ............ 340/442; 73/146.5; 340/443; 340/447

(58) Field of Classification Search ...... 340/442–449; 73/146–146.5
See application file for complete search history.

(56) References Cited

U.S. PATENT DOCUMENTS

| | | | |
|---|---|---|---|
| 4,479,382 A | 10/1984 | Greenhorn et al. | |
| 5,517,853 A | 5/1996 | Chamussy | |
| 5,790,016 A | 8/1998 | Konchin et al. | |
| 6,124,787 A | 9/2000 | Isakov et al. | |
| 6,445,286 B1 * | 9/2002 | Kessler et al. | 340/442 |
| 6,453,737 B2 | 9/2002 | Young et al. | |
| 6,535,116 B1 | 3/2003 | Zhou | |
| 6,553,820 B1 | 4/2003 | Tsagas et al. | |
| 6,609,419 B1 | 8/2003 | Bankart et al. | |
| 6,612,164 B1 | 9/2003 | Meins | |
| 6,756,892 B2 | 6/2004 | Konchin et al. | |
| 6,823,728 B1 | 11/2004 | Barnes | |
| 6,829,924 B2 | 12/2004 | Nantz et al. | |
| 6,870,471 B2 | 3/2005 | Bergerhoff et al. | |
| 6,888,449 B2 | 5/2005 | Lin et al. | |
| 6,970,076 B1 | 11/2005 | Starkey | |
| 6,995,672 B1 | 2/2006 | Yones | |
| 7,009,310 B2 | 3/2006 | Cheung et al. | |
| 7,015,803 B2 | 3/2006 | Yamagiwa et al. | |
| 7,197,922 B2 * | 4/2007 | Rimkus et al. | 73/146 |
| 7,224,267 B1 * | 5/2007 | Ellis | 340/442 |
| 2001/0004236 A1 | 6/2001 | Letkomiller et al. | |
| 2002/0059826 A1 * | 5/2002 | Ono et al. | 73/146.5 |
| 2002/0063623 A1 | 5/2002 | Juzswik | |
| 2002/0095980 A1 | 7/2002 | Breed et al. | |
| 2003/0009270 A1 | 1/2003 | Breed | |
| 2003/0090373 A1 | 5/2003 | Bergerhoff et al. | |
| 2003/0121319 A1 * | 7/2003 | Kojima et al. | 73/146.2 |
| 2003/0201879 A1 | 10/2003 | Munch et al. | |
| 2003/0216845 A1 | 11/2003 | Williston | |
| 2003/0227379 A1 | 12/2003 | Itou | |
| 2004/0159158 A1 * | 8/2004 | Forster | 73/718 |
| 2005/0258949 A1 | 11/2005 | Iwazumi | |
| 2006/0015225 A1 | 1/2006 | McQuade | |
| 2006/0025897 A1 | 2/2006 | Shostak | |
| 2006/0047469 A1 | 3/2006 | Fabre et al. | |
| 2006/0081062 A1 | 4/2006 | Silverbrook et al. | |

\* cited by examiner

*Primary Examiner*—Brent Swarthout
(74) *Attorney, Agent, or Firm*—Jeffer Mangels Butler & Marmaro LLP

(57) ABSTRACT

A method for monitoring pressure is described herein. The method includes the steps of performing an accurate measurement of pressure and performing an approximate measurement of pressure. Then, providing a notification signal if a difference between the approximate measurement and the accurate measurement is greater than a predetermined value. An apparatus for performing the method is also disclosed.

26 Claims, 3 Drawing Sheets

METHOD AND APPARATUS FOR TIRE PRESSURE MONITORING

BACKGROUND

1. Field

The present invention relates generally to sensor systems, and more particularly, to a method and apparatus for tire pressure monitoring.

2. Background

There are two fundamental goals that a tire pressure monitoring system (TPMS) should fulfill for the management system of a vehicle—accuracy and speed of measurements of tire pressure.

Most tire pressure losses result from slow leaks that have a deleterious effect on vehicle handling, fuel consumption, and tire life. When the pressure loss is slight, however, there is generally no immediate danger of catastrophic tire failure. Therefore, although it is important to measure tire pressure with a high degree of accuracy to be able to detect slow air pressure leaks, the timing of these accurate measurements is not critical. In contrast, if a tire loses pressure rapidly, it is important that a driver be warned as soon as possible. In these cases, it is not critical that the rapid tire pressure loss be measured with a high degree of accuracy—an error of measurement of up to 10% of the original pressure is probably acceptable. Thus, in certain circumstances, even an inaccurate but timely pressure measurement will increase the overall system functionality at detecting significant events, thus improving the safety of the system.

Typically, the tire pressure monitoring device is a battery-powered, self-contained sensor device that is mounted inside a wheel. The device transmits measured pressure to a receiver inside the vehicle via a wireless signal. Because the pressure sensor in these devices requires a significant power to operate, many existing systems compromise performance for battery life. For example, to reduce the power utilized by the sensors, the frequency of measurements is decreased when the vehicle is not in motion. Typically a roll switch, which is a switch that is operated by a rolling motion, or an accelerometer is used to detect whether the vehicle is in motion. The inclusion of these types of motion detection devices to provide this functionality increases the cost while reduces reliability of the system and, even with this functionality, conventional systems only measure pressure about every 30 seconds, meaning that a rapid tire pressure loss could still result in an accident before the driver is warned.

It is desirable to be able to provide a TPMS system that has reduced power consumption while improving reliability as compared to current TPMS systems.

SUMMARY OF THE PREFERRED EMBODIMENTS

The present invention is directed to a tire pressure monitoring system (TPMS) that is configured to provide rapid detection of a severe loss of tire pressure while still being able to provide accurate detection of a slow loss of tire pressure. Specifically, the inventive TPMS increases vehicle safety by providing the timely warning to a driver of severe tire pressure loss from such catastrophic events as a tire blowout. At the same time, the inventive TPMS can also detect the minute loss of tire pressure over time from such situations where there is a slow leak in a tire. The inventive TPMS thus addresses both the need for being able to accurately measure tire pressure, which is not urgent, and the need for providing timely warning of a catastrophic event, which does not carry with it the requirement for accuracy.

One preferred embodiment of the present invention is provided in a method for monitoring pressure including the steps of performing an accurate measurement of pressure and performing an approximate measurement of pressure. Then, providing a notification signal if the difference between the approximate measurement and the accurate measurement is greater than a predetermined value.

Another preferred embodiment of the present invention is provided as an apparatus for monitoring pressure having a pressure sensor. The apparatus includes a processor coupled to the pressure sensor; and, a memory coupled to the processor, the memory configured to cause the processor to perform an accurate measurement of pressure using the pressure sensor; perform an approximate measurement of pressure using the pressure sensor; and, provide a notification signal if the difference between the approximate measurement and the accurate measurement is greater than a predetermined value.

In another preferred embodiment, the present invention is implemented as a processor readable medium having instructions stored thereon that, when executed by the processor, causes the processor to performs a method for monitoring pressure. The method includes performing an accurate measurement of pressure; performing an approximate measurement of pressure; and, providing a notification signal if the difference between the approximate measurement and the accurate measurement is greater than a predetermined value.

In another preferred embodiment, the present invention is implemented as a pressure monitoring system including a pressure sensor, a memory and a processor coupled to the memory and the pressure sensor. The processor is configured to obtain an accurate measurement of pressure and an approximate measurement of pressure, and generate a notification if the difference between the approximate measurement of pressure and the accurate measurement of pressure is greater than a predetermined value.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Figure 1:
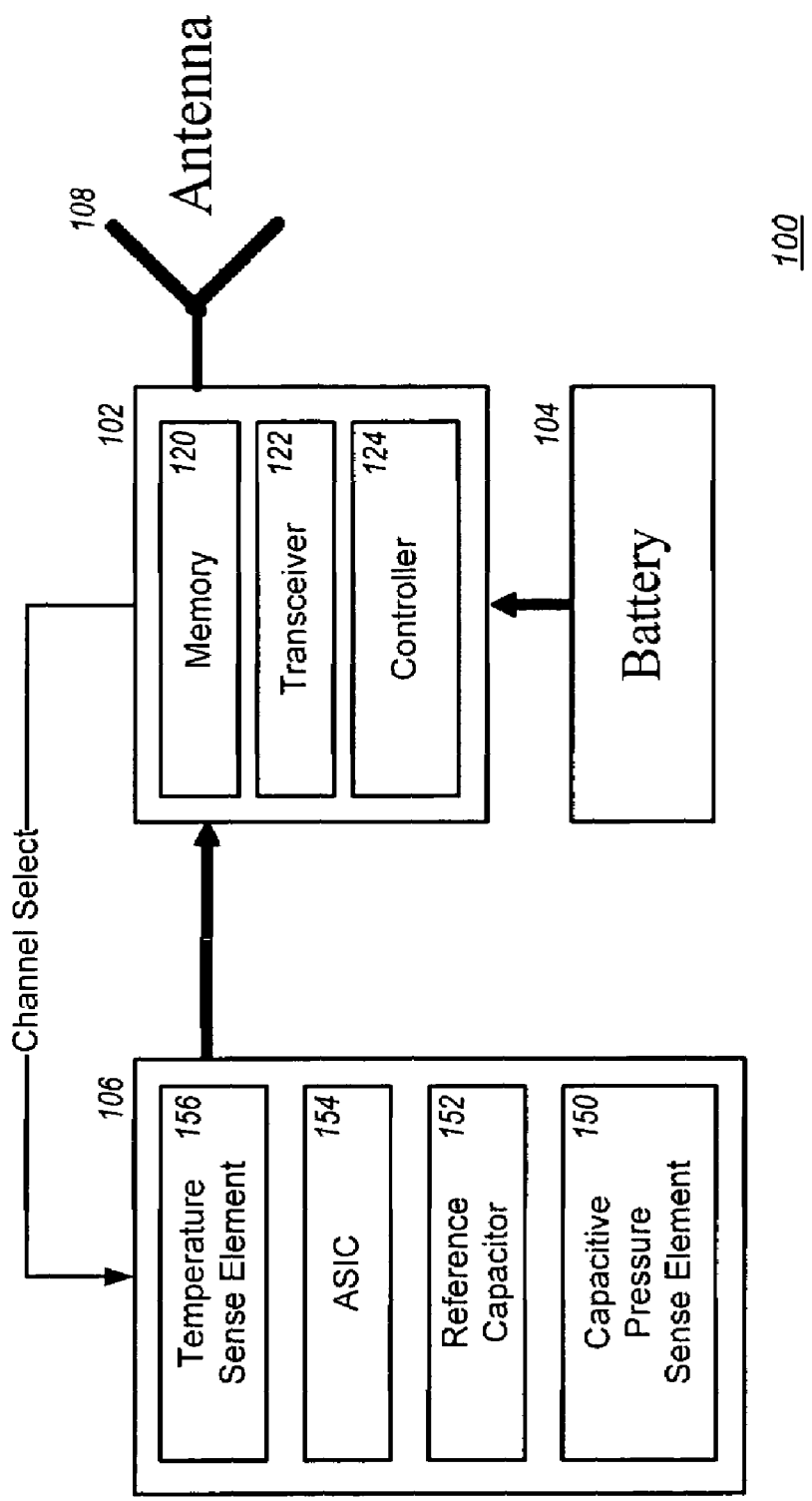
FIG. 1 is a block diagram of a tire pressure monitoring system (TPMS) configured in accordance with one preferred embodiment of a pressure monitoring system.

FIG. 1 illustrates a TPMS system 100, configured in accordance with one preferred embodiment of the present invention, having a microcontroller 102, a pressure sensor 106 and a battery 104, with both pressure sensor 106 and battery 104 being coupled to microcontroller 102. In one preferred embodiment, TPMS system 100 operates in the same mode all the time, regardless of whether the vehicle is in motion, and performs two types of tire pressure measurements: 1) approximate pressure measurements at a first predetermined interval; and, 2) accurate pressure measurements at a second predetermined interval, which are measurements of tire pressure that are more accurate but less frequent than the approximate measurements. At each first predetermined interval, TPMS system 100 transmits an accurate pressure measurement and a temperature measurement to a controller in a vehicle (not shown). In addition, TPMS system 100 stores the accurate pressure measurement. At every second predetermined interval, which in one preferred embodiment is smaller than the first predetermined interval, TPMS system 100 compares the approximate pressure measurement with the previously transmitted accurate pressure measurement. In other preferred embodiments, instead of only comparing the latest approximate pressure measurement to the last accurate pressure measurement, a comparison may be made between the latest approximate measurement and a previous accurate or approximate pressure measurement, referred to as Papproximate($n^{th}-m^{th}$) or Paccurate($n^{th}-m$), respectively, where n is the latest measurement and m>=1. For example, Papproximate ($n^{th}-1$) is the approximate pressure measurement before the latest approximate pressure measurement). In still other preferred embodiments any approximate measurement may be compared to other approximate or accurate measurements.

In one preferred embodiment, only if there is a significant difference between compared measurements of pressure will TPMS system 100 transmit pressure information. In one preferred embodiment, the time period between accurate measurements (and resulting radio transmissions) is approximately 15 minutes, while approximate measurements can be made as often as every 6 seconds. In general, less frequent measurements and/or transmissions will require less power and therefore extend the battery life of battery 104 of TPMS system 100. In other words, TPMS 100 is able to make short term pressure comparisons locally by being able to compare relative measurements/without taking into account such factors such as temperature or other compensation coefficients and without having to involve the use of the vehicle controller. Thus, this decreases the use of power by having fewer transmissions and also decreases the computational load on the vehicle controller.

In one preferred embodiment, pressure sensor 106 is an integrated pressure and signal-conditioning device constructed using MicroElectroMechanical Systems (MEMS) technology and combines a capacitive pressure sense element 150, which is sensitive to absolute pressure, a temperature sense element 156 and an application specific integrated circuit (ASIC) 154. Pressure sensor 106 also incorporates a reference capacitor 152, which is nominally insensitive to pressure, operating as a reference to capacitive pressure sense element 150.

In one preferred embodiment, microcontroller 102 is an integrated power control, controller and transceiver system that interfaces directly with pressure sensor 106. Referring again to FIG. 1, microcontroller 102 includes a memory 120, a transceiver 122, and a controller 124. In one preferred embodiment, transceiver 122 is a radio frequency (RF) transceiver that is able to transmit and receive data and command signals, to and from, respectively, the vehicle controller. Other wireless technologies can be used as well. As disclosed herein, pressure sensor 106 is configured to provide a temperature output and both pressure measurement and reference outputs. In one preferred embodiment, microcontroller 102 utilizes a "channel select" signal to select the desired output from pressure sensor 106. In another preferred embodiment, microcontroller 102 is coupled to simultaneously receive more than one output from pressure sensor 106. Using its transceiver 122, microcontroller 102 is able to transmit measurement data to and receive signals from the controller in the vehicle.

In one preferred embodiment, ASIC 154 converts signals representing measured pressures (and temperatures) into a digital output format that can be directly provided to a microprocessor such as microcontroller 102. Specifically, ASIC 154 converts the capacitance values in capacitive pressure sense element 150 and reference capacitor 152 to pulse durations, referred to as Cp and Cr, respectively. In one preferred embodiment, the output of pressure sensor 106 is a series of pulses, each of which are variable in a width that is proportional to the sensed pressure. Cp represents a capacitance value that varies as a function of measured pressure and Cr represents a capacitance value, measured from a reference capacitor, that is essentially constant with pressure. These pulse durations are then provided to microcontroller 102. Calibration coefficients, stored in microcontroller 102, are then used in the determination of pressure values. Thus, pressure measurements are calculated by measuring the time duration of the appropriate pulses (i.e., the time duration of each pulse). The same basic concept is used for measuring and providing an output of the temperature, T.

In one preferred embodiment, the formula used to determine pressure is given by the following equation:

$$\text{Pressure} = C_{span} \times \left( \frac{Cp - (C_{off} \times Cr)}{Cp - (C_{linearity} \times Cr)} \right) \quad (1)$$

where Cspan, Coff and Clinearity are calibration coefficients that are uniquely determined for each TPMS 100. One exemplary way to determine these three coefficients is to measure Cr and Cp for three known temperatures and then using equation (1) to solve for the three unknowns. In other preferred embodiments, any number of coefficients can be used.

As used herein, the term "pressure measurement" or "measurement of pressure" may be comprised of an actual pressure measurement or representation of pressure measurement. For example, the latest approximate pressure measurement may refer to only Cp or a pressure calculated using Cp. In one preferred embodiment, the approximate pressure measurement consists only of Cp, and thus, the comparison is between two Cp values. For example, the latest measured Cp is compared to the last stored Cp. In another preferred embodiment, a pressure calculated using the latest measured Cp is compared with a pressure calculated using the last stored Cp (where the pressure calculated using the last stored Cp may have been previously calculated and stored). During the calculation of pressure, the same or different Cr values may be used. In one preferred embodiment, the same Cr value may be used for the calculation of both pressures. Thus, equation (1) may be generalized as follows:

$$\text{Pressure}(t1) = C_{span} \times \left( \frac{Cp(t2) - (C_{off} \times Cr(t3))}{Cp(t2) - (C_{linearity} \times Cr(t3))} \right) \quad (2)$$

where t1, t2 and t3 represent a time period. For example, for the calculation of pressure at a time t1 with Cp and Cr measured at time t1, then t3=t2=t1. For the calculation of pressure at time t1 with the latest measured Cp but a previously measured Cr, then t2=t1 and t3=the time of the last measurement of Cr.

It should also be noted that, as used herein, the term "Cp measurement" and "Cr measurement" may mean a single or a combined multiple of Cp or Cr measurements, respectively. In one preferred embodiment, a simple average of multiple Cp and/or Cr measurements may be used. In another preferred embodiment, a weighted average of multiple Cp and/or Cr measurements may be used. For example, the latest Cp and/or Cr measurement may be given greater weight in the calculated average. In other preferred embodiments, other mathematic computations may be made to a single or multiple measurements of Cp and/or Cr. Thus, for example, the reference above to a pressure calculated using Cp could mean a pressure calculated using only a single Cp measurement, or a pressure calculated using multiple Cp measurements, with or without modification by various mathematic functions.

As described below, an "accurate pressure measurement," which in one preferred embodiment includes performing a full set of measurements comprising Cp, Cr and T, is performed periodically. As further described below, once the full set of measurements is taken, a pressure is calculated and the result is transmitted by TPMS 100 to a receiver coupled to the vehicle controller. The value of Cp is also stored at this time. Specifically, Cp and Cr are measured by pressure sensor 106, a pressure is calculated by microcontroller 102, the calculation taking into consideration the calibration factors, and the results of the calculation transmitted using transceiver 122, with Cp being stored in memory 120. In one preferred embodiment, the accurate measurements are made periodically and regardless of whether or not the vehicle is moving. In addition, in between these accurate measurements of Cp, Cr and T, pressure measurements referred to as "approximate pressure measurements," are performed. These approximate pressure measurements calculate pressure by using an equation such as equation (2), but using the Cr value from the previous accurate pressure measurement. Thus, in one preferred embodiment, only the Cp value need to be updated (i.e., pressure sensor 106 is only used to update Cp, with no Cr or T being updated).

In one preferred embodiment, the calculated approximate pressure measurement (calculated using the latest Cp value) is then compared to the last accurate pressure measurement (calculated using the stored Cp value). If the value has changed by more than a threshold amount, a complete measurement (Cp, Cr and temperature) is made and the result transmitted. In another preferred embodiment, a comparison of the latest measurement of Cp is made to the stored Cp, versus a comparison of the pressures calculated using the latest measurement of Cp and the stored Cp. In this case, because the value of Cp represents the value of pressure, a comparison of Cp will be sufficient to determine large pressure changes without the need for TPMS 100 to perform pressure calculations, which results in power savings.

In one preferred embodiment, the temperature (T) is also transmitted with the calculated pressure. In other preferred embodiments, Cp, Cr, and/or T are transmitted to the vehicle controller with or without the calculated pressure. In the case where the calculated pressure is not being transmitted, the vehicle controller is sent the necessary data to perform the pressure calculation.

In one preferred embodiment, at least two pulses from pressure sensor 106 are used for each measurement to compensate for the inherent jitter that exists during any pulse duration measurements. For example, during the measurement of Cr, two or more pulse durations of Cr are read from pressure sensor 106 and averaged to create a final Cr value.

Thus, one aspect of the invention lies in the methodology of making these approximate measurements and their limited impact on overall system performance. In other words, during an accurate pressure measurement, in one preferred embodiment, a number of Cp and Cr cycles are measured. These measurements are averaged to reduce the noise, or jitter, in the measurement. For the frequently taken approximate measurements, only Cp is measured and a pressure calculated using the latest measured Cp (i.e., an approximate pressure measurement) is compared to a pressure calculated using the Cp of the previous accurate measurement. It could be assumed that normally there will be little change of measurement in that time. The measurement of only Cp minimizes the energy required for the measurement. Then, if there is a change in Cp above a specified threshold, which should translate to a related change in the calculated pressure beyond a specified threshold, the system is configured to make a complete accurate measurement and immediately transmit that information to the vehicle controller. TPMS system 100 utilizes the rapid (but approximate) determination of pressure loss that is useful for reporting significant events such as tire blowouts, which does not require accurate tire pressure measurements. At the same time, TPMS system 100, by using accurate pressure measurements, does not sacrifice long-term system accuracy that is useful for reporting slow tire leaks.

Figure 2:
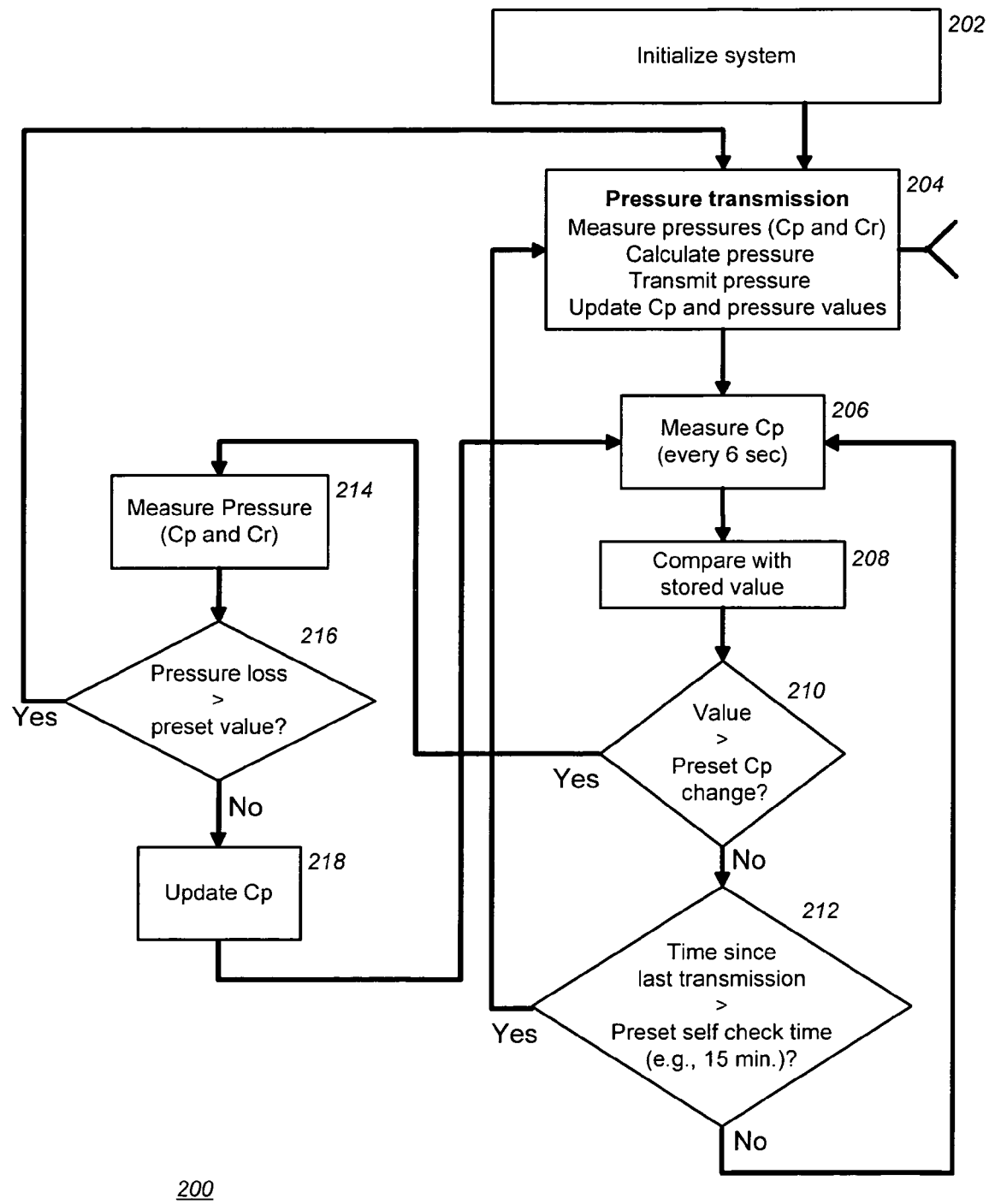
FIG. 2 is a flow diagram illustrating a preferred mode of operation of the TPMS of FIG. 1; and, FIG. 3 is a flow diagram illustrating a mode of operation of a vehicle controller in accordance with one preferred embodiment of operation of a pressure monitoring system.

Referring to FIG. 2, one preferred mode of operation of TPMS 100 will be described, where, starting in step 202, TPMS 100 is initialized. For example, TPMS 100 will clear all temporary memory storage areas and reset all counters.

In step 204, pressure-related (e.g., Cp, Cr) and temperature (e.g., T) measurements are performed, and the pressure calculated using the measurements, as well as the temperature, is transmitted to the vehicle controller. In one preferred embodiment, the pressure and temperature data is transmitted to the vehicle controller with no decisions or comparisons being made by TPMS 100 (i.e., the transmission occurs without a comparison of a current measurement to a previous measurements). The value of Cp is also stored into memory 120 at this step. Assuming a number of sensor cycles (i.e., a number of Cp measurements) are averaged for the final value, the average value of the Cp pulse width is stored.

In step 206, TPMS 100 measures Cp again using pressure sensor 106. In one preferred embodiment, this Cp measurement occurs every 6 seconds. As previously noted, this Cp measurement may be comprised of multiple Cp pulses. After TPMS 100 measures Cp, operation continues with step 208.

In step 208, in accordance with one preferred mode of operation, the latest Cp measurement is compared to the stored Cp value, with no pressures being calculated. In another preferred embodiment, the latest approximate pressure measurement (e.g., a pressure calculated using the latest measured Cp value) is compared to the last accurate pressure measurement (e.g., a pressure calculated using the Cp value stored in memory 120). It should be noted that memory 120 can also store previously calculated pressures, which will reduce the need for microcontroller 102 to re-perform calculations.

In step 210, it is determined if the difference between the measured Cp value and the stored Cp value (or, in the alternative, the difference between the calculated pressures) as determined in step 208 is greater than a predetermined amount. In one preferred embodiment, this predetermined amount may be set somewhere between 0 and 25%, with a more preferred range being in the 3%-5% range. For example, it is determined if the difference is more than 5%. In one preferred mode of operation, if the difference is larger than the predetermined amount, then the process proceeds to step 214. Otherwise, process 200 continues with step 212.

In step 212, TPMS 100 determines if the last transmission time is greater than preset "self-check" time (e.g., 15 minutes). If so, operation returns to step 204, where TPMS 100 performs a full measurement and transmission, as previously described. If the last transmission time has not passed the preset self-check time, then operation returns to step 206, where a new Cp value will be measured 6 second after the last Cp value measurement.

In step 214, TPMS 100 will perform a measurement of both Cp and Cr, and a new accurate pressure measurement will be calculated based on these measurements. Operation will then continue with step 216. In another preferred embodiment, instead of performing step 214, operation can return to step 204, where the T, Cp and Cr values are determined and the current pressure is calculated. For example, in this other preferred embodiment, if a comparison of the measured Cp and the stored Cp in value in step 210 indicates a large change, which indicates a catastrophic pressure loss, then TPMS 100 can immediately return to step 204.

In step 216, the accurate pressure measurement calculated using the latest Cp and Cr measurements in step 214 is compared with the last accurate pressure measurement. If the difference does not exceed a predetermined amount, then the process continues with step 218, where the latest Cp is stored and from which operation returns to step 206. In one preferred embodiment, this predetermined amount may be set somewhere between 0 and 25%, with a more preferred range being in the 3%-5% range. For example, it is determined if the difference is more than 5%. Otherwise, if the pressure loss is greater than the predetermined amount, then the process returns to step 204.

Figure 3:
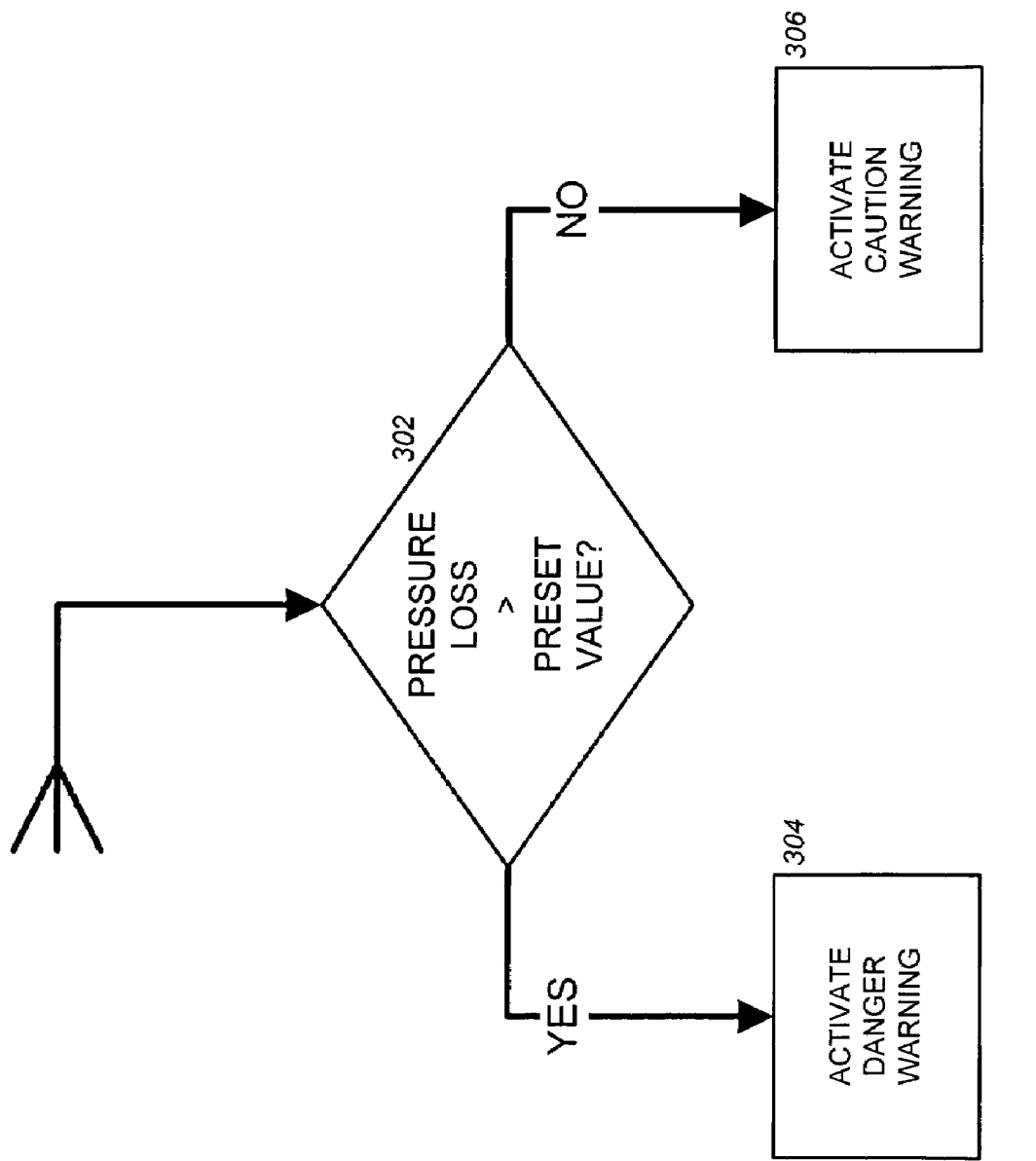

In one preferred mode of operation, as illustrated by a process 300 in FIG. 3, the vehicle controller will determine if the reported pressure loss is greater than a predetermined value in step 302. If so, then most likely a catastrophic tire pressure loss event has occurred and operation will continue with step 304, where a danger warning will be sent to the driver. Otherwise, the detected change in pressure most likely represents a tire pressure leak event and operation will continue with step 306, where a caution warning will be provided to the driver. In the embodiment illustrated in FIG. 3 and described herein, the amount of detected pressure loss is presupposed to require that at least a caution be provided. Specifically, the amount of pressure loss detected by TPMS 100 is above a level that indicates that at least a slow leak exists. It is then up to the vehicle controller to determine the level of warning to provide. In another preferred embodiment, TPMS 100 can perform all required calculations and provide warnings for both slow and catastrophic tire pressure loss scenarios to the vehicle controller such that the vehicle controller does not have to perform any calculations. In this case, TPMS 100 can send either a danger warning (i.e., severe tire pressure loss has been detected), or a caution warning (i.e., a low amount of tire pressure loss has been detected). In still another preferred embodiment, TPMS 100 can send a signal that indicates the system is working and no tire pressure change has been detected.

In step 304, where the pressure loss as determined in step 302 is larger than a predetermined value, the vehicle controller will activate a danger warning because significant tire pressure loss has been detected due to an event such as a tire blow out. In one example, a caution warning is raised if the pressure loss is less than 25% from the last measured pressure, and a danger warning is raised if the pressure loss is greater than or equal to 25% as compared to the last measured pressure. The provided thresholds herein for FIGS. 2 and 3 are exemplary, and other thresholds may be used based on the specific implementation.

In step 306, where the pressure loss as determined in step 302 is not larger than the predetermined value, the vehicle controller will activate a caution warning because a loss of tire pressure has been detected due to an event such as a small leak in the tire.

As described herein, TPMS 100 will accurately measure long-term tire pressure fluctuations and report them to the vehicle controller. Also, any pressure change greater than a defined value can be reported within a short time to the vehicle controller. Neither tire rotation nor vehicle operation is required for this to take place.

A TPMS sensor may be created using the description attached in the Appendix, labeled as "Appendix to 59452-5094," the contents of which is fully incorporated herein.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A method for detecting changes in pressure, using relatively little power, comprising:
   obtaining a first measurement of pressure from a pressure sensor at a first interval;
   obtaining a plurality of approximate measurements of pressure from the pressure sensor at a second interval; and
   providing a notification when a predetermined change in pressure measurements is detected between any of the measurements.

2. The method of claim 1, wherein the notification is provided when a predetermined change in pressure is detected between the first measurement and at least one of the approximate measurements of pressure.

3. The method of claim 1, wherein obtaining the first measurement of pressure comprises:
obtaining a reference pressure measurement;
obtaining an actual pressure measurement;
comparing the reference pressure measurement with the actual pressure measurement;
compensating the actual pressure measurement based upon the reference pressure measurement whereby the first pressure measurement is obtained.

4. The method of claim 1, wherein the notification is provided when a predetermined change in pressure measurements is detected between each of the approximate measurements over time.

5. The method of claim 3, wherein obtaining a first pressure measurement comprises measuring the output of a capacitive pressure sensor.

6. The method of claim 1, wherein obtaining the first measurement of pressure comprises adjusting the measurement based on temperature.

7. The method of claim 1, wherein obtaining the first measurement of pressure comprises adjusting the measurement based on calibration factors.

8. The method of claim 1, wherein the first interval is no longer than fifteen minutes.

9. The method of claim 1, wherein the second predetermined interval that is less than the first predetermined interval.

10. The method of claim 8, wherein the second interval is no longer than 15 seconds.

11. The method of claim 1, further comprising comparing the approximate measurement to the first measurement to determine the difference between the approximate measurement and the first measurement.

12. The method of claim 1, further comprising performing a second measurement of pressure.

13. The method of claim 1, wherein providing the notification further comprises transmitting pressure data.

14. An apparatus for monitoring pressure, using relatively little power, comprising:
a pressure sensor capable of measuring both a reference capacitance and a pressure capacitance;
a processor coupled to the pressure sensor; and,
a memory coupled to the processor, the memory configured to cause the processor to:
perform an accurate measurement of pressure using the pressure sensor during a first interval;
perform a plurality of approximate measurements of pressure using the pressure sensor during a second interval; and,
provide a notification when a predetermined change between the approximate measurement and the accurate measurement is detected.

15. The apparatus of claim 14, wherein the memory is further configured to cause the processor to provide a second notification signal when a predetermined difference in pressure is detected between the first measurement and at least one of the approximate measurements of pressure.

16. The apparatus of claim 14, wherein the pressure sensor comprises a reference sensor and a pressure sense element, and performing the accurate measurement of pressure using the pressure sensor comprises:
obtaining a reference pressure measurement using the reference sensor;
obtaining an actual pressure measurement using the pressure sense element;
comparing the reference pressure measurement with the actual pressure measurement;
compensating the actual pressure measurement based upon the reference pressure measurement whereby the accurate measurement is obtained.

17. The apparatus of claim 16, wherein the first notification is provided when a predetermined change in pressure measurements is detected between each of the approximate measurements over time.

18. The apparatus of claim 16, wherein the pressure sense element is a capacitive pressure sensor.

19. The apparatus of claim 14, wherein said pressure sensor comprises a temperature sensor element coupled to the processor, wherein performing the accurate measurement of pressure comprises:
performing a temperature measurement using the temperature sensor; element; and,
compensating for the accurate measurement of pressure based on the temperature measurement.

20. The apparatus of claim 14, wherein the first interval is no longer that fifteen minutes.

21. The apparatus of claim 14, wherein the second interval that is less than the first interval.

22. The apparatus of claim 14, wherein the second interval is no longer than 15 seconds.

23. The apparatus of claim 14, wherein the memory is further configured to cause the processor to compare the approximate measurement to the accurate measurement to determine the difference between the approximate measurement and the accurate measurement.

24. The apparatus of claim 14, wherein the memory is further configured to cause the processor to perform a second accurate measurement of pressure using the pressure sensor.

25. The apparatus of claim 14, further comprising a transceiver coupled to the processor, wherein providing the notification further comprises transmitting pressure data using the transceiver.

26. A processor readable medium having instructions stored thereon that, when executed by the processor, causes the processor to performs a method for monitoring pressure comprising:
performing an accurate measurement of pressure by obtaining a reference pressure measurement; obtaining an actual pressure measurement; comparing the reference pressure measurement based upon the reference pressure measurement whereby the first pressure measurement is obtained at a first interval determined by the processor;
performing a plurality of approximate measurements of pressure at a second interval as determined by the processor; and,
providing notification if a predetermined change is detected between any of the measurements.

* * * * *